Figure 1:
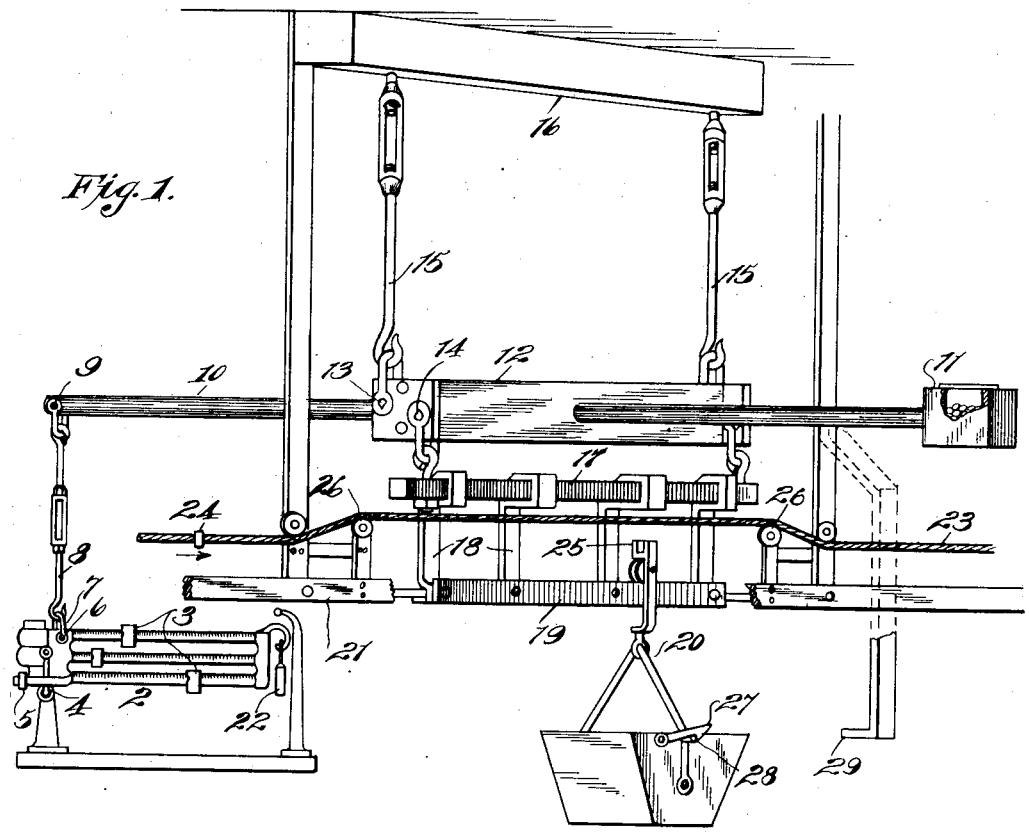

J. MANES.
TRACK SCALE.
APPLICATION FILED FEB. 2, 1911.

998,540.

Patented July 18, 1911.

Witnesses:
F. E. Maynard
Thos. Eastberg

Inventor:
John Manes;
By G. H. Strong
his Atty.

UNITED STATES PATENT OFFICE.

JOHN MANES, OF SAN FRANCISCO, CALIFORNIA.

TRACK-SCALE.

998,540.   Specification of Letters Patent.   Patented July 18, 1911.

Application filed February 2, 1911. Serial No. 606,207.

*To all whom it may concern:*

Be it known that I, JOHN MANES, citizen of the United States, residing in the city and county of San Francisco and State of California, have invented new and useful Improvements in Track-Scales, of which the following is a specification.

This invention relates to weighing machinery and particularly to an apparatus whereby masses of material of considerable weight may be weighed during transit.

The object of the present invention is to provide a simple, accurate, powerful weighing machine; to provide a weighing machine involving a power member substantially in the form of a trackway of considerable length in order to allow the weight of a mass being determined during the transit of the mass; to provide in combination a power beam flexibly suspended from a balance lever and means whereby a carrier may be impelled across the power beam, and a transmitting member so mounted as to obviate the chances of the weight of said member being imposed upon the weighing machine; and to provide in combination with a weighing machine a fixed trackway and device for automatically releasing a load carrier to permit of the discharge of the load after it has been weighed.

The invention consists of the parts and the construction and combination of parts, as hereinafter more fully described and claimed, having reference to the accompanying drawings, in which—

Figure 2:
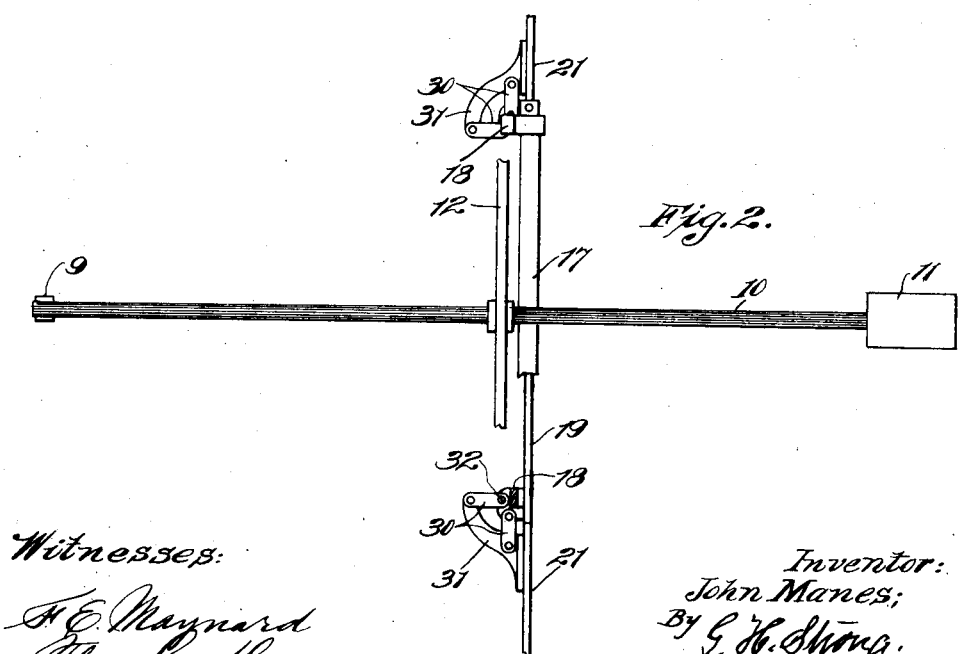

Figure 1 is a perspective view of the weighing apparatus. Fig. 2 is a plan view of the balance lever with the center beam broken away to show connections between the power rail and the fixed trackways.

In the embodiment of my present invention 2 represents a registering scale of any preferred form or design, here shown as comprising three beams, upon which may be adjusted poises 3, and the scale is connected by a link 4 to a fixed standard. To the rear of the link 4 is mounted a poise 5 whereby slight adjustments and corrections or allowances may be made to compensate for loads not to be calculated in determining the weight of a mass passing through the weighing machine. Upon a knife-edge 6 of the scale 2 is mounted a link 7, to which is connected a steelyard 8 mounted at its upper end to a knife-edge 9.

The knife-edge 9 is mounted upon one end of an appropriate balance lever 10, here shown in the form of a cylindrical bar, upon the opposite end of which is mounted a counterbalancing device 11. At an appropriate distance between the ends of the balance lever 10 is mounted transversely a substantial member hereinafter to be designated as a center beam, as 12, having mounted at its outer ends a set of knife-edges 13 and another set indicated at 14. To the knife-edges 13 of the center beam 12 are connected vertical suspension links 15, which are suitably mounted upon a supporting device, here indicated as the member 16.

One of the important and distinctive features of the present invention is the suspension from the knife-edges 14 of a substantial device, here represented as a frame 17 which comprises a plurality of suspension bars 18, to which is rigidly secured a substantial rail 19 of suitable length.

One of the principal purposes of the present invention is to design and provide in a weighing machine a power or load member of considerable length, whereon may travel a conveyer or carrier here represented at 20; the purpose of obtaining the long power rail being to afford ample time for obtaining the weight of the load in the carrier 20 as it traverses the rail.

In operation the carrier 20 runs on to the power or load member 19 from suitable fixed tracks 21 having their ends alined with and in juxtaposition to the ends of the power member 19, and at the instant the load is imposed on the rail 19 the weight is transmitted through the connections to the knife-edges 14, thus effecting the balance of the balance lever 10 and applying a force to the steel-yard 8 which will affect the sensitive beam of the scale 2, upon the outer end of which may be mounted a suitable bottle weight, as 22.

As hereinbefore stated, the counterpoise 5 is provided for the purpose of compensating for loads which may be imposed upon the weighing apparatus and which it is not desired to have indicated upon the scale 2, and in this instance the counterpoise 5 is adjusted to compensate for the weight of the conveyer or carrier device 20; thus when one of the carriers is impelled on to the rail 19, its weight will be counterbalanced by the counterpoise 5 and only the weight of the charge or load in the carrier 20 will have to be counterpoised by the members 3.

Another provision of the present invention is a means whereby a carrier 20, of which a number may be provided, may be impelled across the power rail 19 and in the present instance this means comprises a cable or other suitable traveling device upon which may be mounted projections or members 24 adapted to engage a portion, as 25, of the carriers 20 during the travel of the carriers along the fixed rail 21. As the carrier approaches the power rail 19, the cable 23 is led upwardly over suitable guide pulleys 26, so as to disengage the driving members 24 from the carriers 20 and thereafter the carriers will run on the power rail of the weighing machine entirely free from the cable 23, thus avoiding any possible chance of the weight of the cable or member 23 being transmitted to the weighing apparatus.

This invention may be adapted to a variety of uses, as, for instance, in abattoirs, storage plants, in colliers, and in mining operations generally, thus allowing the load of the carrier to be determined during its traverse of the rails 21 and the power member 19. As it is sometimes desirable to unload the conveyers 20 adjacent to the weighing mechanism, I have provided upon each carrier 20 a suitable retaining or latching mechanism comprising a pawl 27 pivoted upon the carrier 20 and adapted to engage a pin 28 upon the bucket of the carrier and retain this in the carrying position. In the path of the pawl or member 27 and suitably connected to a portion of the fixed rails 21 is an abutment 29 adapted to engage the pawl 27 at a predetermined position, release the bucket of the carrier and allow the discharge of the load from the bucket.

Various means may be provided for preventing longitudinal and horizontal motion of the power rail 19 as regards the adjacent terminals of the fixed tracks 21, and in the present instance this means includes a plurality of radial links 30, which are pivoted at one of their ends to a bracket 31 rigidly fastened upon the fixed rails 21. The other ends of the radial links 30 are pivoted at 32 to projections secured upon the bars 18, which are fastened adjacent to the ends of the power member 19. The disposition of the radial links 30 is such that the links prevent the power member 19 from moving transversely or longitudinally and yet permit a sufficient vertical freedom of motion to allow the actuation of the balancing lever 10.

The bar or rail 19 may be made in any length and I have found that it can be used practically in lengths of as much as twelve feet or more.

Having thus described my invention, what I claim and desire to secure by Letters Patent is—

1. A weighing machine comprising a balance-lever, a center beam transversely secured upon said balance-lever, suspension knife-edges upon the ends of said beam, and a power or load rail suspended by said beam transversely below the balance-lever.

2. A weighing machine comprising a balance-lever, a center beam transversely secured upon said balance-lever, suspension knife-edges upon the ends of said beam, a power or load rail suspended by said beam transversely below the balance-lever, and a scale beam connected to one end of the lever.

3. A weighing machine comprising a balance-lever, a center beam transversely secured upon said balance-lever, suspension knife-edges upon the ends of said beam, a power or load rail suspended by said beam transversely below the balance-lever, a scale beam connected to one end of the lever, and fixed tracks alined with said rail.

4. A weighing machine comprising a balance-lever, a center beam transversely secured upon said balance-lever, suspension knife-edges upon the ends of said beam, a power or load rail suspended by said beam transversely below the balance-lever, a scale beam connected to one end of the lever, fixed tracks alined with said rail, and flexible connections between said tracks and rail.

5. A weighing machine comprising a balance-lever, means for connecting said lever to a support, a center beam transversely secured to said lever, knife-edges supported in the ends of said beam, a power frame suspended on certain of said knife-edges, said frame including a track adapted to receive a load, and a scale connected to the lever.

6. A weighing machine comprising a balance-lever, means for connecting said lever to a support, a center beam transversely secured to said lever, knife-edges supported in the ends of said beam, a power frame suspended on certain of said knife-edges, said frame including a track adapted to receive a load, a scale connected to the lever, and fixed rails flexibly connected to, and alined with, said track.

7. A weighing machine comprising a balance-lever, means for connecting said lever to a support, a center beam transversely secured to said lever, knife-edges supported in the ends of said beam, a power frame suspended on certain of said knife-edges, said frame including a track adapted to receive a load, a scale connected to the lever, fixed rails flexibly connected to, and alined with, said track, and means supported on the fixed rails whereby a load carrier may be impelled across the tracks.

8. A machine for weighing a mass while in transit, comprising a runway, a carrier adapted to traverse said runway and transport the mass to be weighed, a beam, knife-edges on the beam and supporting the runway, a balance lever to which said beam is connected, and a scale connected to said lever whereby the weight of the mass in transit over the runway is indicated.

In testimony whereof I have hereunto set my hand in the presence of two subscribing witnesses.

JOHN MANES.

Witnesses:
   CHARLES EDELMAN,
   G. MOTT.

Copies of this patent may be obtained for five cents each, by addressing the "Commissioner of Patents, Washington, D. C."